G. WINGATE.
Baking-Molds.

No. 153,414.  Patented July 21, 1874.

UNITED STATES PATENT OFFICE.

GEORGE WINGATE, OF CHARLESTOWN, MASSACHUSETTS.

IMPROVEMENT IN BAKING-MOLDS.

Specification forming part of Letters Patent No. 153,414, dated July 21, 1874; application filed March 31, 1874.

*To all whom it may concern:*

Figure 1:
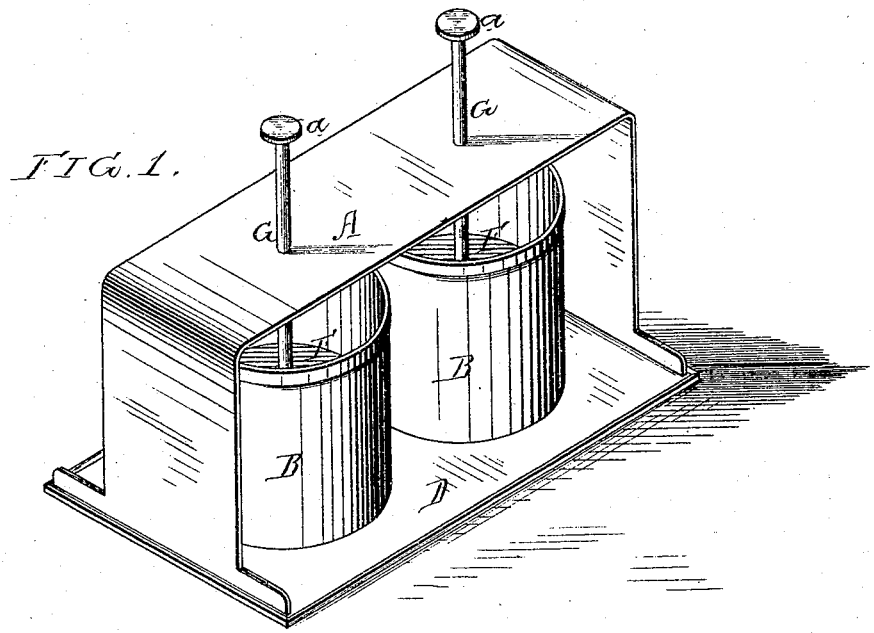
Figure 2:
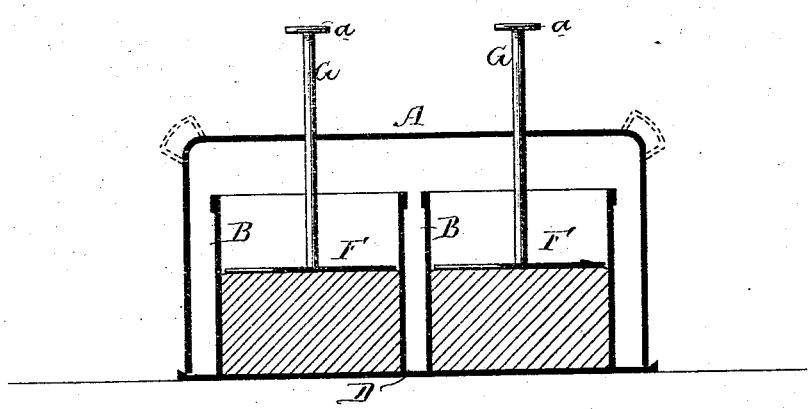

Be it known that I, GEORGE WINGATE, of Charlestown, Middlesex county, State of Massachusetts, have invented an Improved Baking-Mold, of which the following is a specification:

My invention relates to improvements in molds wherein to bake bread; and the object of my invention is to guide and facilitate the removal of the sliding covers or plungers from the molds when two or more of the latter are arranged closely together or secured to a single base, and I attain this object by the combination of a detachable frame, A, with the molds B, and their plungers and plunger-rods, as fully described hereafter, and as represented by the perspective view, Figure 1, and sectional elevation, Fig. 2, of the accompanying drawing.

The molds B are simple cylindrical vessels, open at the top and secured at the bottom to a base-plate, D, and each provided with a sliding cover or plunger, F, the rod G of which extends upward through and is guided by a frame, A, resting upon or temporarily secured to the base-plate in such a position in respect to the molds that the plungers may slide freely in the latter, and be maintained by the said frame in their proper horizontal positions.

In using the apparatus each mold is partially filled with bread or cake dough, and the frame A, with the plungers and the plunger-rods suspended from the same by means of their projections a, is then lowered into position so that each plunger shall enter its proper mold, and rest upon the dough contained therein, as shown in Fig. 2. The whole is then placed in an oven, by the heat of which the dough will be more or less expanded, and the plungers and their rods correspondingly elevated; but the weight of the latter will prevent undue or irregular expansion at the top of the loaf, which will be smooth and flat, and as moist as the sides and bottom of the said loaf.

On removing the apparatus from the oven the whole of the plungers can be lifted from the tops of the loaves and out of the molds by means of the frame A, after which the molds may be simply inverted, when the loaves will fall out by their own gravity.

In the present instance I have illustrated two molds only, but it will be evident that any desired number may be arranged side by side, and combined with a single frame, A, in accordance with my invention.

I claim as my invention—

The combination, substantially as described, of two or more molds, B B, their plungers, and their plunger-rods, with the detachable frame A.

In testimony whereof I have signed my name to this specification in the presence of two subscribing witnesses.

GEORGE WINGATE.

Witnesses:
FRANCIS LEWIS,
WM. H. MILLER.